I. N. RICHARDSON.
Playing-Cards.

No. 155,752.           Patented Oct. 6, 1874.

WITNESSES
Levi C. Wade
J. L. English

INVENTOR
Ivory N. Richardson

UNITED STATES PATENT OFFICE.

IVORY N. RICHARDSON, OF REVERE, MASSACHUSETTS.

IMPROVEMENT IN PLAYING-CARDS.

Specification forming part of Letters Patent No. 155,752, dated October 6, 1874; application filed August 8, 1874.

*To all whom it may concern:*

Be it known that I, IVORY N. RICHARDSON, of Revere, in the county of Suffolk and State of Massachusetts, have invented a new and useful Improvement in Playing-Cards, of which the following is a specification:

This invention relates to improvements in playing-cards, on some of which are displayed certain emblems known as "hearts," "spades," "clubs," and "diamonds," while on others are displayed certain heads known as "kings," "queens," and "jacks," together with such emblems; and the invention consists in a distinguishing or indicating color for each suit of cards, such as black for spades, red for hearts, green for clubs, and yellow for diamonds, together with figures, numerals, or other indicators, placed at the edge or border of the card, which numeral or indicator shall show the size or value of the card, whereby the player, as soon as his eye catches such numeral or indicator upon any card, will, by the color and indicator, at once know of which suit it constitutes a part, and what is its size or value, without, as heretofore, discerning the configuration of the emblems it bears, or the number thereof. The invention also consists in round playing-cards, each suit of which is thus characteristically colored, and has displayed upon the edge or borders of the cards figures or numerals indicating the size or value thereof.

Figure 3:
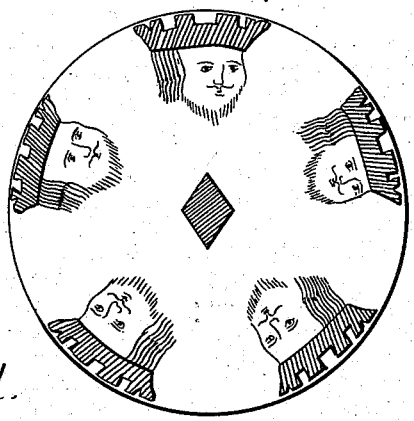
Figure 1:
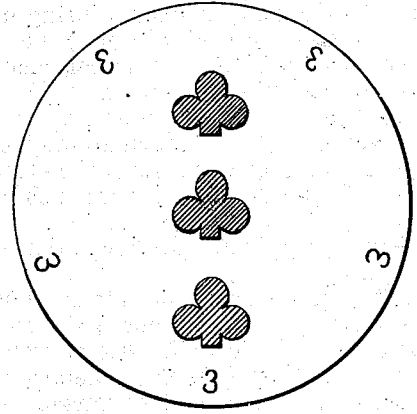
Figure 2:
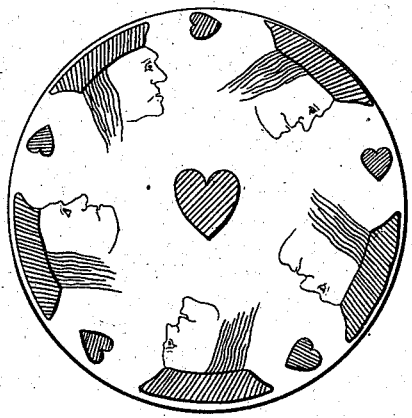

Figure 1 represents the "three of clubs," with indicating-numerals around the border or edge. Fig. 2 represents the "jack of hearts," arranged with a heart in the center, and with the heads and hearts around the border of the card. Fig. 3 represents the "king of diamonds," the diamond being shown in the center, and the heads radially around the card.

Although preferring a round card, yet I propose to make them in any desired form; nor do I limit myself to any prescribed color for either suit of card, so that each suit of the "pack" be of a different color; yet I prefer the colors as above described.

The ground of the cards may be white, with the emblems and numerals, or the faces and emblems, in colors, or the ground of the several suits may be of their characteristic colors with the emblems and numerals, or emblems and faces, shown in white. The faces may be of any desired colors or shades, while the accompanying emblems are of the indicating-color. Both the emblems and the border numerals may be employed, as shown in Fig. 3, or the emblems alone, or the numerals alone. The emblematic cards may (instead of having the emblems printed or shown thereon) be indicated solely by color and number, as shown in Fig. 2, in which case either the ground or the numeral may be of the characteristic color, and the numerals, instead of being in the center, as shown in Fig. 2, may be arranged around the border, or numerals may be used both in the center and on the border.

I make no claim to a round card; nor do I claim, broadly, the combination of either the heads or the emblems, or of the indicating-numerals in combination with such emblems; but What I do claim, as a new article of manufacture, is—

1. Playing-cards, each suit of which is indicated by a different color, and provided with numerals to indicate the size or value of the card, and having such numerals, or in lieu thereof, a distinguishing margin or border, corresponding in color with the suit to which the card belongs, substantially as described and shown, for the purpose set forth.

2. Round playing-cards, each suit whereof is indicated by a distinguishing-color, and with numerals to indicate the size or value of the cards, substantially as described and shown.

IVORY N. RICHARDSON.

Witnesses:
LEVI C. WADE,
J. L. ENGLISH.